United States Patent [19]

Baltzer et al.

[11] Patent Number: 5,670,024
[45] Date of Patent: Sep. 23, 1997

[54] THERMAL TREATMENT PROCESS FOR WASTE AND/OR RESIDUAL MATERIALS

[75] Inventors: Franz Baltzer; Horst Jüptner, both of Jena, Germany

[73] Assignee: WTU Warmetechnik und Umweltschutz GmbH, Jena, Germany

[21] Appl. No.: 379,671

[22] PCT Filed: Aug. 6, 1993

[86] PCT No.: PCT/EP93/02100

§ 371 Date: Feb. 6, 1995

§ 102(e) Date: Feb. 6, 1995

[87] PCT Pub. No.: WO94/03406

PCT Pub. Date: Feb. 17, 1994

[30] Foreign Application Priority Data

Aug. 8, 1992 [DE] Germany ............... 42 26 271.2

[51] Int. Cl.$^6$ ............................................. C10B 51/00
[52] U.S. Cl. ............................. 201/25; 201/27; 201/42; 202/100; 202/131; 202/136; 202/184; 134/2; 134/10; 422/59
[58] Field of Search .................... 201/25, 9, 27, 201/42; 202/100, 131, 136, 137; 422/184; 134/2, 10, 11, 39, 42; 432/59, 72, 149, 186

[56] References Cited

U.S. PATENT DOCUMENTS

| 3,847,664 | 11/1974 | Gravel ........................... 134/2 |
| 3,950,861 | 4/1976 | Weimer et al. ........................... 34/130 |
| 5,019,171 | 5/1991 | Hanson, Jr. et al. ........................ 134/2 |

FOREIGN PATENT DOCUMENTS

| PS-2 199 856 | 4/1974 | France . |
| PS-887 626 | 7/1949 | Germany . |
| OS-2 341 406 | 3/1974 | Germany . |
| PS-113 209 | 5/1975 | Germany . |
| 28 49 476 | 10/1979 | Germany ............... C03C 25/02 |
| PS-146 450 | 2/1981 | Germany . |
| PS-233 994 A1 | 3/1986 | Germany . |

*Primary Examiner*—Christopher Kim
*Attorney, Agent, or Firm*—Horst M. Kasper

[57] ABSTRACT

For thermally treating waste and/or residual materials, in particular fiber glass, glass silk, glass wool and glass mat coated with organic materials, a drum (1) with embedded elements is used to make the materials circulate. In this drum the materials are heated up to a temperature at least equal to the carbonization and/or evaporation temperature of the coatings but lower than the softening temperature of the materials. The waste or residual materials are preferably increasingly disaggregated in the drum and are heated by a stream of hot gas which flows in the drum from the discharge side (11) to the inlet side (4) and has its highest temperature at the discharge side.

9 Claims, 4 Drawing Sheets

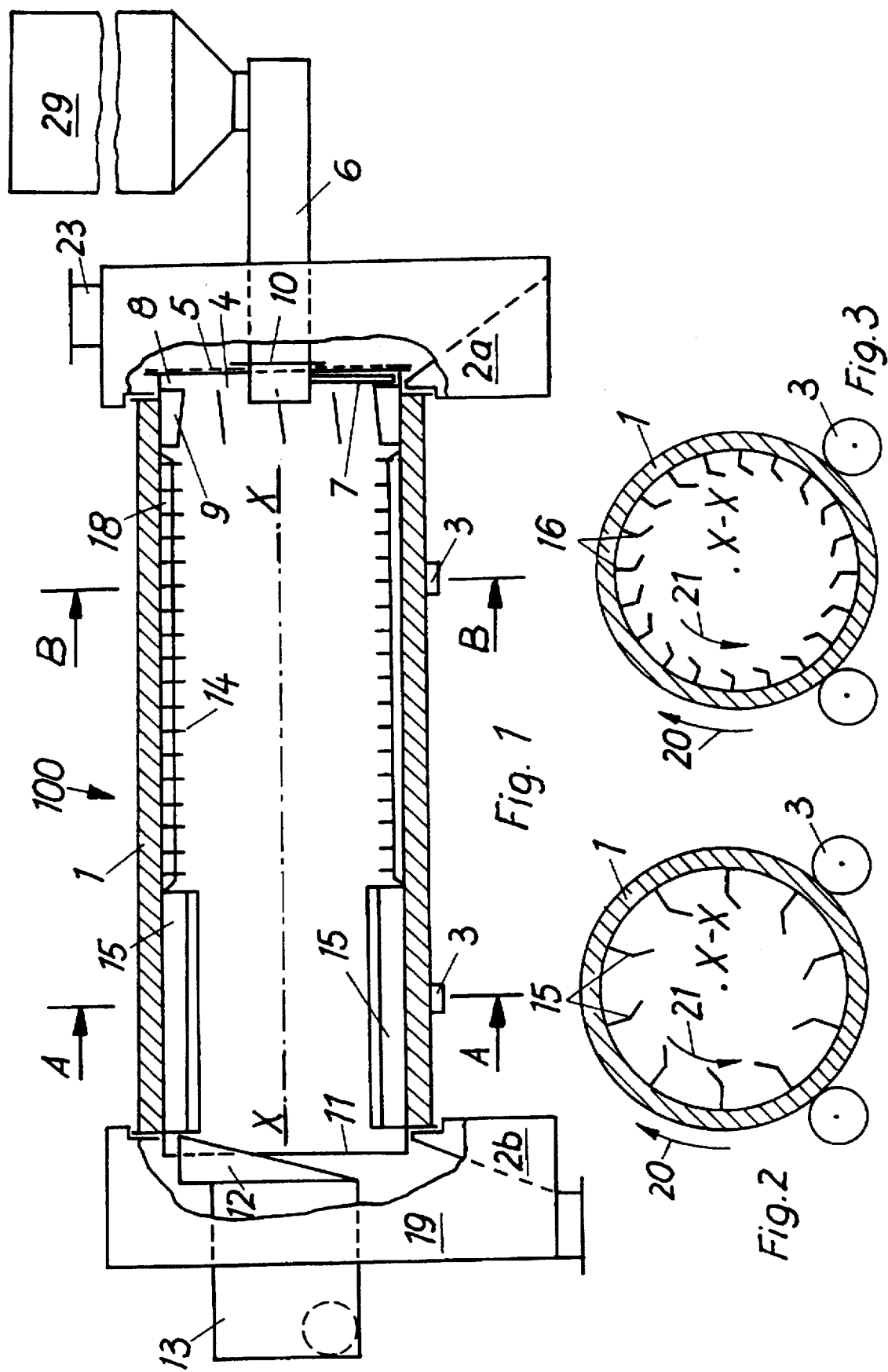

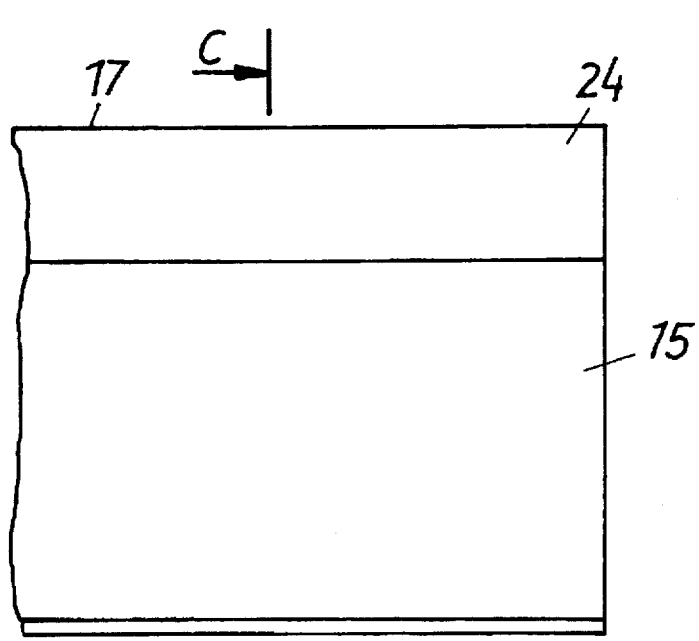
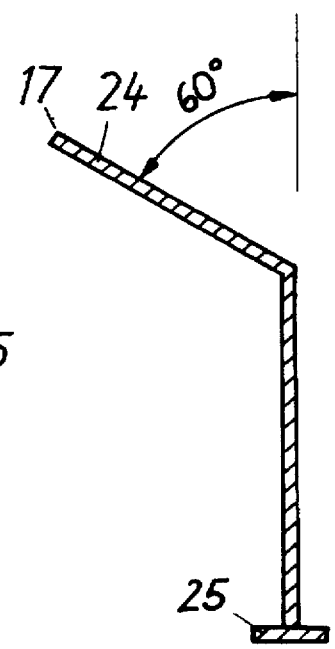
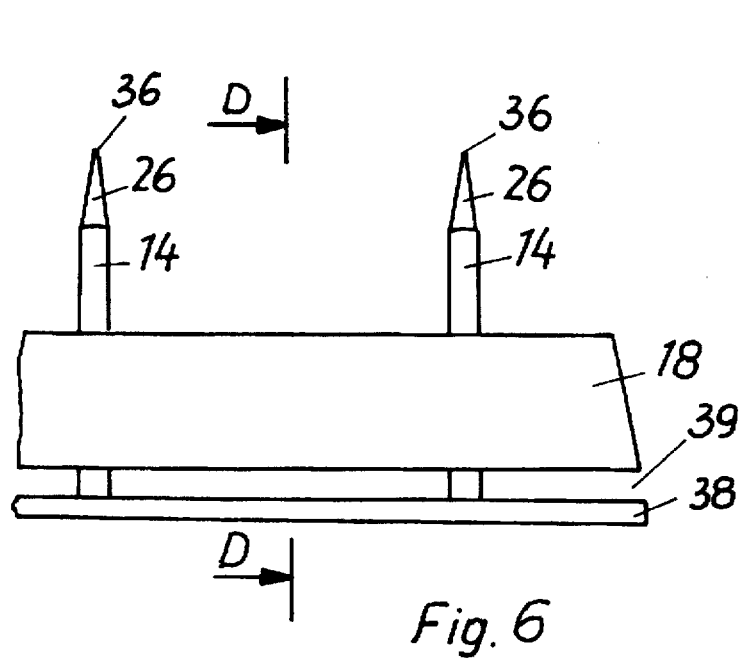
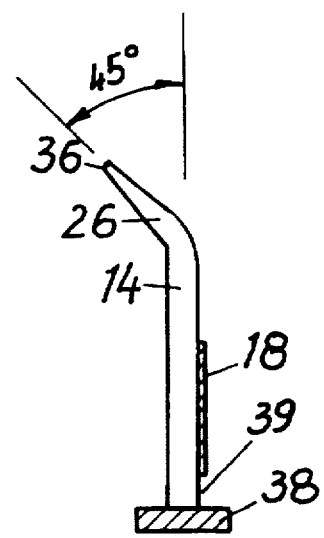

THERMAL TREATMENT PROCESS FOR WASTE AND/OR RESIDUAL MATERIALS

SPECIFICATION

The invention relates to a method of and a device for thermal treatment of waste and/or residual materials, particularly of fiberglass, glass silk, glass wool, glass mats coated with organic materials including products made thereof according to the kind of the claims also with respect to their reuse.

The reuse of fiber glass waste, glass silk waste and products made thereof, and/or glass wool waste and similar materials which include fiber glass, as filling materials, for example, in the plastic products or the building industry, or the recovery for raw products for the glass melting process requires the removal of organic cover materials during the manufacturing process. This can be achieved by rinsing when the cover layer is in a liquid state, that is, has not hardened, yet, which is, however, disadvantageous for environmental reasons and expensive owing to the comparatively high water consumption.

Very often it has been tried to remove an organic envelope from fiber materials by heat treatment. Thus the French Patent Specification FR-PS 2199 856 discloses a method in which the organic materials contained in residuals of anorganic fibers are fed into an electrically heated furnace, the upper zone of which has such a temperature which melts the cover layer from the residual products. Resulting gases pass off via a respective exhaust duct.

Such a solution is disadvantageous since the combination of preparation and melting process leads to deficiencies in quality. Since waste of glass silk is not exclusively for being melted again it is very often thermally treated in plants specially devised for that purpose. So from the Patent Specification DD-PS 113 209 a method for preparation of glass silk waste is known, where the latter is first pressed to form mats, then put on lorries to be heated in a tunnel kiln and then is water quenched. This step is followed by a mechanical crushing. It is further known from the DE-OS 28 49 476 to subject pre-crushed fiber glass waste to a three-stage thermal treatment with gradually rising temperatures. This is achieved by employing horizontally or vertically operating pusher-type furnaces, in which the waste is stage-wise transported and remains a considerable time at each stage.

Furthermore a method is known from the Patent Specification DD-PS 146450 for a recovery of glass raw material from waste resulting from the glass silk spinning process. Said waste is mechanically crushed under the jet assembly tank and passes within a three-hour-period preferably two temperature stages of a gas or electrical continuous heating furnace. In the first stage a cover layer is burnt off and in the second stage a cooling down below 150° C. is carried out which, is followed by a mechanical crushing, whereby resulting gases are suctioned off during the first stage. Such methods require an additional operational step before the thermal treatment, for example, a preliminary crushing of the waste, which, in turn, requires special devices. The furnace transit time of the waste from the glass silk spinning process is relatively long. Furthermore, the DE-OS 23 41 406 discloses a method and device for a recovery of glass fibers from coiled up endless mats of glass fiber waste. After passing a pre-heater the mats are kept floating over a traveling screen by force of the heating gases. The flue gases from the furnace are fed into the pre-heater. The amount of liquid gas required makes the method for recovery of the glass fibers too expensive. The Patent Specification DD-PS 233 994 discloses an electric continuous-heating furnace which operates with circulating air. This invention is disadvantageous since when fine-fibrous material is treated the air stream probably drags along fiber particles or individual fibers which, in turn, leads to short circuits of the electrical heating.

Finally, drying drums or rotating kilns are known from the Patent Specifications DE-PS 258 336 and DE-PS 887 626, respectively, which are provided with lifting paddles or surfaces on the interior walls for revolving the material to be dried and to be burnt, respectively. The employment of such drying drums or rotating kilns for thermal treatment and preparation of materials is uneconomic and does not lead to the desired purity of the products.

It is an object of the present invention to obviate the disadvantages of the state of art and to provide a method and device for thermal treatment of waste materials and residual materials, respectively, particularly of glass silk, fiber glass, glass wool, and glass mats comprising organic material, including products made thereof, which permits a substantially complete removal of the organic envelope from the materials concerned in a considerably short time and which also permits the thermal treatment of considerably large charges, (for example one ton per hour and more) of respective materials. It has to be considered that a high temperature sinters the waste materials and avoids an escape of the reaction products in the course of the thermal treatment, and that too slow a heating renders the recycling process expensive.

According to the invention the object stated hereinabove is solved by the features of the attached patent claims 1 and 11. The good, preferably increasing disintegration during the transport of the waste and residual materials, respectively, from the charging side to the discharging side and the hot gas stream directed from the discharging side to the charging side which simultaneously serves to disintegrate and to thermally treat the waste and/or residual materials in addition to a falling temperature gradient ensure that the disturbing organic envelopes are inexpensively removed from the waste materials and the residual materials, respectively, and that the glass contained in the latter is made available for reuse.

Advantageously, the waste and/or residual materials are crushed before entry to a maximum size (fiber length) which substantially does not exceed 30 cm. The disintegration is predominantly achieved by installations within the drum, which either rotate with the latter or rotate relative to the non-rotating drum. The drum with the installations or the installations relative to the drum rotate with a speed of 5 to 30 rotations per minute, preferably 8 to 15 rotations per minute. The hot gas having a temperature of 250° C. to 850° C. preferably passes the drum according to the counter flow principle. The materials stay for at least 2.5 minutes within the drum. A duration of 6 to 8 minutes lies within a range which can still be tolerated from an economical point of view. The speed with which the hot gas stream moves within the drum is about 0.2 m/sec relative to a mean inner drum cross section at a temperature of 0° C.

Advantageously, the hot gas stream is not only fed into the discharge side of the drum in opposition to the direction of rotation of the drum, but also tangential and askant relative to the drum axis. It is advantageous from a technical, environmental, and from an energy point of view, when the exhaust gases leaving the drum are subject to a filtering and combustion and the resulting hot gases are partially fed back into the drum. The amount of the feedback and the temperature of the hot gas obtained in this manner are controlled via the fresh air supply.

An advantageous device for carrying out the method according to the invention comprises the installations in the drum for revolving the waste and/or residual materials as well as an hot gas feed at the discharge side of the drum, and an exhaust gas outlet at the charging side of the drum. The drum itself is of a cylindrical or conical shape, or of any suitable combination of cylindrical portions and conical portions. Depending on the construction selected, the drum can be arranged horizontally, vertically, or in any suitable inclined position. Advantageously, the drum is rotatably arranged about a substantially horizontal axis. Particularly in this case the installations are pins and/or stripes selected from heat-proof materials, which are substantially at right angles to the interior wall of the drum and secured to said interior wall. It is one further advantage when the stripes are spot-connected to the interior wall, thus the portions of the wall and the stripes, which are parallel to one another form interstices of a width of 10 to 15 mm through which small fiber particles of the waste is or residual materials pass to always find a position at the deepest portion of the drum and so substantially escape the hot gas stream. Hence, the exhaust gas stream is scarcely loaded with small fiber particles.

The pins or stripes provided in a horizontally or inclinedly extending drum which serve to disintegrate, to revolve, and to transport the waste and/or residual materials particularly satisfy their task when they are pointed and provided with sawteeth, respectively, which enables them to more easily slide into and out of the materials treated in the drum. This operation is supported when they are offset in direction of rotation of the drum.

The pins are arranged on the interior wall of the rotating drum in rows which may be surface lines, circular lines, elliptical lines or helical lines. In the same manner the heatproof stripes (sheet metal stripes) being provided with sawtooth extensions can be arranged. Anyway, it is advantageous when the straight length of the pins or of the stripes is one fifth to one twentieth, preferably one tenth of the drum diameter, at a minimum, however, 8 cm. The offset of the pins starts, considered from the tip portion, at about the middle of the pin length. In any case, the angle of offset is 30° to 90°, preferably 45° to 60°. The transport of the waste and residual materials in the drum is supported by arranging the pins or the sawteeth along curved lines running on the circumference of the drum. The space between two adjacent tips of pins and sawteeth, respectively, in one row is about 50 to 200 mm, preferably 100 mm. It is advantageous, when two adjacent rows of pins or sawteeth arranged along surface lines have an angular distance of 10° to 45°, preferably 15° to 20°. The linear distance between two rows should not fall below 100 mm and should not exceed 350 mm.

When fine waste particles are transported it is advantageous to arrange in parallel to a row of pins a stripe of heatproof material contacting the pins, the height of said stripe being about one half or two thirds of the length of a pin.

When the fiber waste is of considerable length, the rows of pins are arranged along the entire longitudinal extension of the drum. In case of comparatively short fiber waste, for example, glass wool waste, it is advantageous to provide offset pins on the charging side of the drum and stripes of heat proof material such as sheet metal on the discharge side for the rotation and the transport of the waste. In this case the offset pins occupy about one third and the offset stripes about two thirds of the drum length. The offset of the pins is 45° and of the stripes 60°. In general, the offset angles of the pins and of the stripes are adapted to the materials treated and vary within the drum. If suitable, no offset, at least partially, is required.

The drum diameter should be at least 0.8 m, depending on the height of fall required for the materials to be treated. From an economical point of view, 2.0 m are considered as the upper limit for the diameter. For the reason of transport, it is advantageous when the drum is slightly inclined from the charging side towards the discharge side. The inclination should not exceed 10°. The waste and/or residual materials, however, might require a rise from the charging side to the discharging side. This, particularly, is the case when a cleaning of the circulating air stream (exhaust gas/hot gas) should be intensified by the materials themselves.

The external wall of the drum is provided with an insulating envelope for heat insulation.

In order to transport the waste and/or residual materials along the desired direction when charged and in order to avoid a material stagnation, guide paddles are provided at the interior wall of the charging side of the drum. Thus the materials are transported into the interior of the drum and a slide back or a drop out is avoided. Preferably a fluff filter is located at the charging side of the drum to avoid the escape of fine particles contained in the waste and/or residual materials via the exhaust gas. A wiper arm is attached to an input charge device which is preferably centrally arranged projecting through the fluff filter into the, drum, said wiper arm is for wiping accumulations of particles off the fluff filter with each rotation of the drum about its axis. The longitudinal extension of the drum is optional, from an economical and an operational point of view it should not be shorter than 1.5 m and should not exceed 10.0 m.

Advantageously, the drum is provided with a combustion chamber which simultaneously serves for producing hot gas and for after-burning the exhaust gases from the drum, said gases being loaded with evaporations and carbonization process products resulting from the organic covers. A filter is installed between the drum and the after-burning combustion chamber.

Further features of the invention become obvious from the embodiments disclosed hereinafter and explained in more detail in combination with the schematical drawings.

BRIEF DESCRIPTION OF THE DRAWINGS

FIG. 1 shows a longitudinal section of a drum according to the invention including the axis, FIG. 2 a cross section along a line A—A of FIG. 1, FIG. 3 a cross section along a line B—B of FIG. 1, FIG. 4 a view of a portion of an offset stripe of sheet metal, FIG. 5 a sectional view of the offset stripe of FIG. 4 along a line C—C, FIG. 6 a portion of a row of pins, FIG. 7 a sectional view along a line D—D of FIG. 6, FIG. 8 a schematical view of a rotating drum in combination with a combustion chamber operative as a hot gas generator and as an after-burner for exhaust gas, FIG. 9a schematical view of a vertically arranged drum according to the invention.

In FIG. 1 a rotating drum 1 of an inventional device 100, inclined by 3° is rotatably seated about an axis X—X on bearings 3 and mounted in mounting heads 2a and 2b. A charging end portion 4 of the rotating drum 1 is provided with a fluff filter 5 through which a charging device 6 projects into the rotating drum 1 by about 0.1 m. A wiping means 7 for wiping the fluff filter 5 is mounted upon the charging device 6. Remote from the charging end portion 4 by a space 8, guide paddles 9 are mounted on the interior wall. An annular sealing 10 is provided upon the charging device 6 for sealing the fluff filter 5. The charging end portion 4 is opposed by a discharge end portion 11 into which a hot gas nozzle 12 of a hot gas feeding device 13 projects in such a manner that a hot gas stream, discharged by the nozzle 12, is directed into the interior of the rotating drum 1 tangentially and askant relative to the interior wall.

Figure 8:
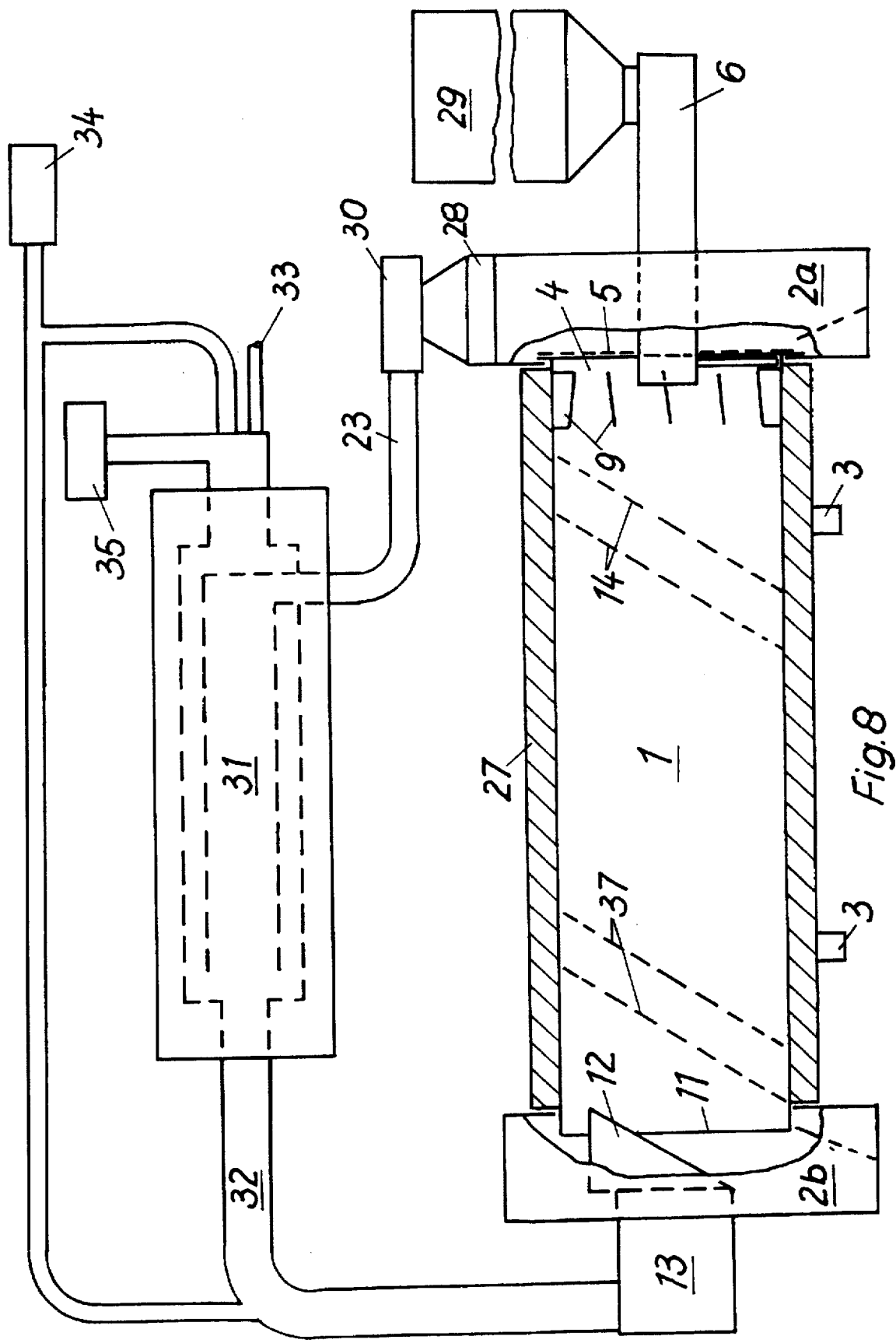

The rotating drum 1 is provided in the vicinity of the charging side 4 along one third of its length with offset pins 14 which are arranged along rows which run in parallel to the surface lines and to the axis of rotation X—X of the rotating drum 1. On the output side 11 offset metal sheet stripes 15 are provided in the rotating drum 1 also in parallel to the surface lines, said stripes 15 extending about two thirds of the length of the rotating drum 1. The range of the offset pins 14 links up with the range of the offset stripes 15, however, the spaces between the rows of stripes on the circumference are greater than those between the rows of offset pins 14. In other words, more rows of pins 16 than stripes 15 are distributed along the circumference of the rotating drum 1. Additionally, a non-offset sheet metal stripe 18 is coordinated in parallel to each row of pins 16 and connected to the latter. The hot gas nozzle 12 and the hot gas feed device 13 are embodied and arranged in a manner that a sufficient enough space 19 is left for discharging the treated waste materials. The rotating drum 1 rotates about the axis X—X in a direction indicated by an arrow 20 in FIG. 2 and FIG. 3, respectively. The hot gas stream from the nozzle 12 is, indicated by an arrow 21, in opposition to the rotation direction 20. The offset of the pins 14 and of the stripes 15 coincides with the rotation direction 20.

Waste material 22 (for example glass wool) is fed into the rotating drum 1 via the charging device 6. The charging device 6 is arranged relative to the charging side 4 in such a manner that any waste and/or residual material 22 fed in falls upon the guide paddles 9 thus preventing, in cooperation with the fluff filter 5, any flow back from the charging side 4.

The guide paddles 9 ensure that any waste and/or residual material 22 moves into the interior of the rotating drum 1. The diameter of the rotating drum 1 should be 1 m and its length 3 m. Due to the inclination of the rotating drum 1 and its speed of rotation of about 10 r/min the waste moves within five minutes to the discharge side 11. In the course thereof it is picked up by the offset pins 14 and the offset stripes 15 and carried to the top and released when in the highest possible position. Fine particles of the waste 22 are treated in the same manner at first by the stripes 18 and then by the offset stripes 15. Thus the hot gas stream originating from the hot gas nozzle 12 flows around the entire faces of the waste 22 and removes any organic components therefrom. The exhaust gas is carried off via an exhaust pipe 23. The thermally treated waste materials leave the rotating drum 1 via the discharge side 11.

The embodiment according to FIGS. 1 to 3 is concerned with the treatment of short fibrous waste (shorter 5 cm).

When waste of longer fibers is to be treated (longer 5 cm), it is feasible to entirely replace the offset stripes 15 by offset pins 14 and, if suitable, to omit the sheet metal stripes 18 or only to employ them on the discharge side 11. It is also feasible to arrange the heatproof stripes 15 and/or the rows of pins 16 along curved lines on the interior wall of the rotating drum 1 rather than along surface lines.

FIGS. 4 and 5 represent a portion of a heatproof stripe 15 which exhibits an offset of 60°. This stripe of material 15 is provided with a base 25 via which it is secured to the interior wall of the rotating drum 1. The offset 24 lies at about two thirds of the height of the material stripe 15 and at a distance of one third from the tip 17, respectively.

FIGS. 6 and 7 show a row of pins 16 which are secured to the interior wall of the rotating drum 1 via a base 38, the upper third of the pins exhibiting offsets 26 of 45°. The offsets 26 are provided with free pointed end portions 36 so when these points 36 and the offsets 26 intrude into the waste material 22 they have rather a spitting effect than a low displacing one, which effect is additionally supported by the counterflowing hot gas stream. A sheet metal stripe 18 is arranged in parallel to the pins 14 in spaced relation to the base 38 (or to the interior wall) so that an interstice 39 constitutes between the former and the base 38 (or the interior wall of the rotating drum) of 1 cm to 1.5 cm width extending along the entire length of the metal sheet stripe 18. It is feasible to replace file points 17 and 36 by any suitable spherical portions which support the sliding of the waste materials 22 on the sheet metal stripes 15 and the pins 14, respectively.

It is also feasible to replace the individual pins 14 and the sheet metal stripes 18 by broader sheet metal stripes 15 which are provided, in analogy to the pins 14, with offset sawtooth top portions occupying up to half the width of the broader sheet metal stripes.

In FIG. 8 a rotating drum 1, comprising a charging end portion 4, a fluff filter 5, guiding paddles 9 and a discharge end portion 11, is seated for rotation in bearings 3 and is provided with an insulating envelope 27.

The drum 1 is provided with offset pointed pins 14 which are arranged along helical lines 37 on the interior wall of the drum 1. Two adjacent pins are spaced apart by 100 mm, the linear distance between adjacent helical lines 37 is about 200 mm. The hot gas feed 13 including the hot gas nozzle 12 is arranged in the head portion 2b of the discharge end portion 11. The head portion 2a arranged at the charging end portion is provided with a filter 28 and a suitable exhaust gas pipe connection 23. Furthermore the head portion 2a is provided with a charging device 6 comprising a screw conveyer or a vibrating slide (not shown) which are connected with a silo 29. The charging device 6 conveys, for example, the long fibrous waste materials from the silo 29 into the drum 1. In the pipe connection 23 an exhaust gas van 30 is installed via which the pipe connection is connected to a combustion chamber 31 which generates hot gas as well as after-burns the exhaust gas. The exhaust gas van 30 draws in the exhaust gas, mechanically purified in the filter 28, from the input end portion 4 of the drum 1 and feeds it into the combustion chamber 31 for burning. The combustion chamber 31 is connected via a further pipe 32 to the hot gas feed 13 attached to the drum 1. Additionally, the combustion chamber 31 is provided with a gas supply pipe 33 for the combustion gas, a combustion air van 34 for adjustably drawing in fresh air (outside air) required for burning the gas and an exhaust gas van 35 which draws off that portion of the after-burnt gas not fed into the hot gas feed 13. The combustion chamber 31 is adapted to generate the hot gas which is fed into the drum 1 via the pipe 32, the hot gas feed 13, and the hot gas nozzle 12. The drum 1 rotates with a speed of about 10 rotations per minute.

The hot gas, in its operational state, is fed in with about 0.8 m/sec. in opposition to the direction of rotation of the drum 1 and to the direction of movement of the materials to be treated and has a temperature of about 800° C. at the discharge end portion 11. The waste materials stay for about 6 min. in the drum 1. The organic components are entirely removed from the waste material which pass the drum 1. The exhaust gases from the drum 1 pass the filter 28 and arrive purified by the filter 28 and via the pipe 23 at the combustion chamber 31 in which they are after-burnt and used for the hot gas generation.

Figures 9, 10:
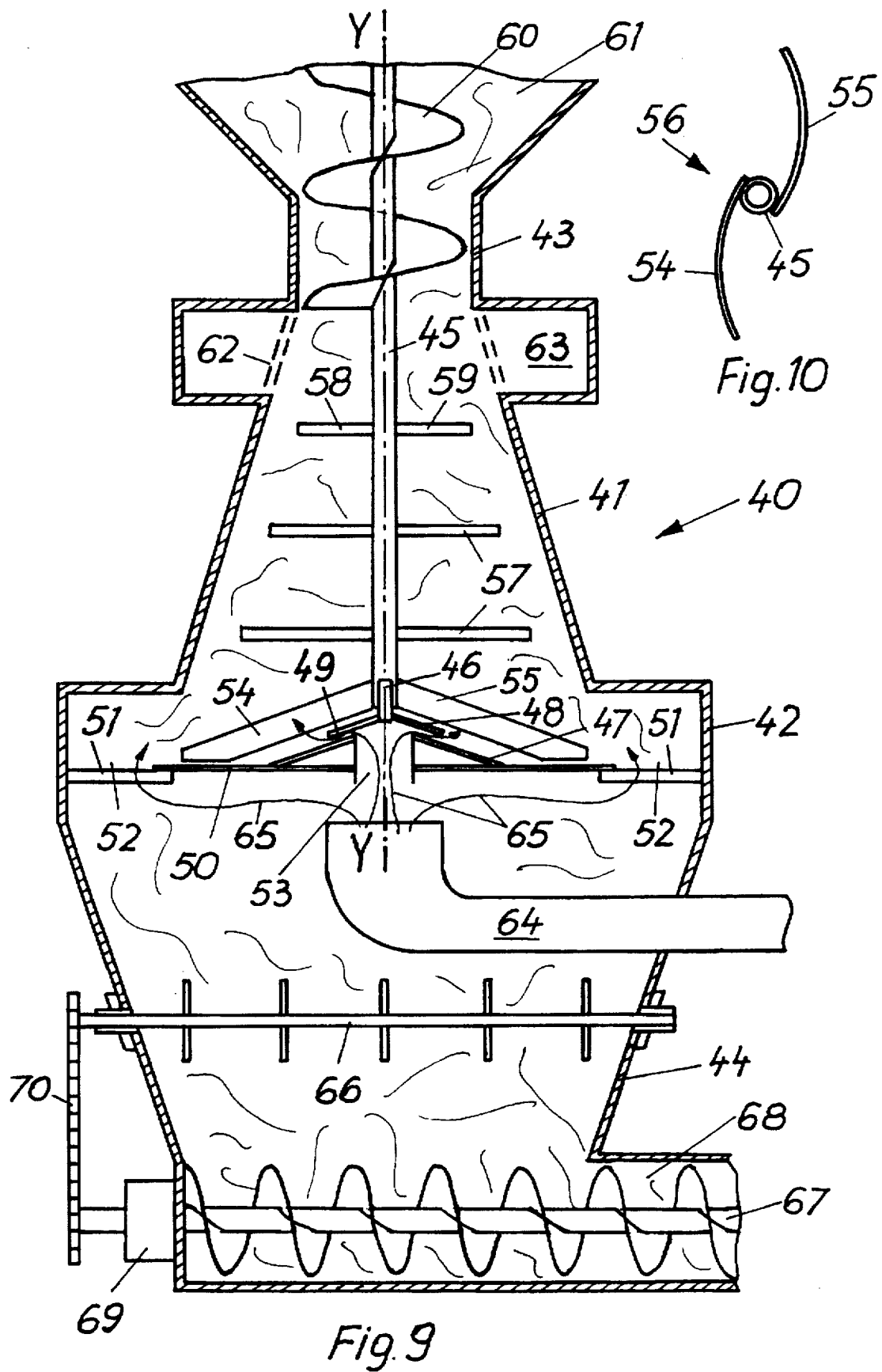
FIG. 10 is a plan view of a pair of stirring or wiping arms.

FIGS. 1 to 8 are based on a substantially horizontally arranged cylindrical rotating drum 1 with installations provided on the interior wall in the shape of pins 14 and stripes 15. The following FIGS. 9 and 10 are based upon a non-displaceably and vertically arranged drum 40 constituted of a conical housing 41 and a laterally extending cylindrical housing 42, upon which a funnel-shaped housing 43 is superimposed. The drum 40 is secured to a base housing 44, the conical shape of which is inverted to that of the drum 40. The drum 40 and the housings 43, 44 are embodied and arranged substantially symmetrical about a common axis Y—Y which is simultaneously the axis of rotation of an axle 45. The axle 45 is seated in a pivot 46 on its bottom end portion, a drive mechanism and bearing (both not shown) are arranged at the upper end portion of the axle 45. The pivot 46 is supported by a bi-partite cone 47, 48, the upper portion 48 of which projects roof-like over the lower portion 47 being spotwise secured to the former so that sufficiently large passages are provided between the two cone portions 47, 48. The lower portion 47 is secured to the base 50 of the drum 40, wherein the base 50 is in turn rigidly connected via a rim of mounting arms 51, only two of which being visible, to the drum wall in such a manner that sufficiently large recesses 52 are constituted in the base face of the drum 40. The base 50 is also provided in its center with a recess 53.

The axle 45 is provided at its lower end portion within the cylindrical portion 42 with a wiper 56 having two arms 54, 55 (FIG. 10), and is further provided, in the conical portion 41, with a three-stage stirrer 57 having at least two stirring arms 58, 59 of matched length in each stage. It is feasible to embody the stirring arms 58, 59 and also the wiper arms 54, 55 straight, or, as shown in FIG. 10, curved and/or twisted. It is also feasible to inclinedly arrange them, just as the sweeping arms 54, 55, relative to the axle 45. The axle 45 is enclosed by and rigidly connected to a worm conveyer 60 in the range of the funnel 43 which conveyer transports the waste and/or residual materials 61 into the drum 40.

The drum 40 is provided with openings 62 at its charging end portion adapted to connect an exhaust gas channel 63. A hot gas channel 64 which projects into the base housing 44 ends at the discharge end portion and supplies hot gas 65 for the drum 40 through the recesses 52, 53 in the base 50. The hot gas 65 can have a temperature of from about 200° C. to about 850° C.

In the base housing 44 a disintegrator device 66 is rotatably seated, and so is a discharge worm conveyer 67 extending into a channel 68 which is operatively connected to a collecting vessel (not shown). A drive means 69 rotates the discharge worm conveyer 67 and, via a gear means 70, the disintegrator device 66.

The worm conveyer 60 feeds the glass fibers coated with organic components into the drum 40 for being revolved and disintegrated by operation of the three-stage stirrer 57 which rotates with a frequency of about 15 rotations per minute. The glass fibers stay for about 8 min. in the drum 40 which has an input portion diameter of 40 cm and an output portion diameter of 120 cm. The hot gas stream 65 of about 800° C. passes through the channel 64 in such a manner that it flows in contact with the disintegrated materials with a speed of about 0.2 m/sec. and removes up to less than 0.2% of the organic components contained in the envelope. The such desized materials are conveyed by the wiper 56 via the recesses 52, 53 into the base housing 44 and from here into a not shown collecting vessel by operation of the discharge worm conveyer 67. The exhaust gases produced in the drum 40 are subjected, as a considerably cooler gas of about 200° C., to a treatment, in analogy to FIG. 8, via the exhaust channel 63 and are partially returned as hot gas mixed with fresh air via the channel 64 into the operational process.

The invention is not restricted to the embodiments disclosed hereinabove. It also is feasible to operate the drum 1 in a more inclined position, to provide it with cylindrical and conical sections and to embody it only conically in which case it is seated in parallel to a surface line. The charging input 6 is not necessarily provided centrally, it can also be located in the lower half of the drum 1. It is feasible to vary the offsets of the pins in a row 15. It is feasible to embody the drum 40 only cylindrically or conically, the length of the arms of the stirrer 57 being suitably matched in this event. The base 50 of the drum can be flat, the bipartite cone 46, 47 being omitted then.

In that case the central recess 53 is omitted. Adapted to the individual stages of the stirrer 57, retarding means can be arranged adjacent under the respective stirring arms 58, 59 to prolong the delay of the waste and/or residual materials and from which they are transported by the operation of the stirring arms to the next lower stage and to the base of the drum 40, respectively, and from here to the base housing 44. Alternatively to FIG. 9, it is feasible to constitute the opening of the hot gas channel 64 in opposition to the base 50 out of a plurality of nozzles distributed over a large area which additionally exhibit different ejection directions. The disintegrator device 66 can be constituted of individual stirrers only mounted in the base housing 44 in the vicinity of the wall. The base housing 44 is not restricted to the conical shape shown. If required, it can be of rectangular, cylindrical, or of a geometry which broadens towards the bottom. It is also feasible to replace the discharge worm conveyer 67 by a plurality thereof. The charging of the coated waste and/or residual materials (glass fiber 61) is not restricted to a vertically arranged worm conveyer 60; it can be horizontally arranged or entirely omitted. In this case the force of gravity suffices to charge the waste and/or residual materials 61. The number of stirring arms 58, 59 and the mutual distance between them and relative to the wall of the drum 40 can vary in dependence on the material to be treated. Furthermore, a combination of the inventional features disclosed in the individual embodiments is feasible.

We claim:

1. A method for thermal treatment of waste and residual material having coats of organic materials comprising:

employing a drum having a rotation axis and having radially disposed projections being rotatable about the rotation axis with 5 to 30 rotations per minute;

feeding the waste and residual material in said drum from a charging end portion;

transporting said waste and residual material through the drum within at least 2.5 minutes;

continuously and progressively disintegrating said waste and residual material during transporting said waste and residual material from the charging end portion to a discharging end portion;

heating said waste and residual material by only a hot gas stream having a temperature of 200° C. to 850° C. in the drum and flowing from said discharging end portion to said charging end portion with a speed of about 0.2 m/sec, related to a mean free cross-section of said drum and 0° C.;

carbonizing and evaporating said coats of organic material in the drum; and completely combusting said organic material.

2. The method as claimed in claim 1, wherein said waste and residual material (22, 61) are size reduced before the thermal treatment in such a manner that dimensions of pieces of said waste and residual material substantially do not exceed 30 cm.

3. The method as claimed in claim 2, wherein the disintegration is achieved by rotating the drum (1) provided with the disintegrating installations (14, 15).

4. The method as claimed in claim 2, wherein the disintegration is achieved by rotating the disintegrating installations (45, 56, 57) relative to a non-rotating drum (40).

5. The method as claimed in anyone of the claims 1 to 4, further comprising:

filtering and burning exhaust gases leaving said drum (1, 40); and partially returning gases (65) produced by burning exhaust gases into said drum (1, 40).

6. The method as claimed in claim 1, wherein said waste and residual material remains in the drum for 2.5 min to 8 min.

7. The method as claimed in claim 1, wherein said waste and residual material is glass silk.

8. The method as claimed in claim 1, wherein said waste and residual material is fiber glass.

9. The method as claimed in claim 1, wherein said waste and residual material is glass wool.

* * * * *